UNITED STATES PATENT OFFICE.

JOHN W. McAULIFFE, OF NEW YORK, N. Y.

LAVATORY OR SINK.

1,107,817. Specification of Letters Patent. Patented Aug. 18, 1914.

Application filed July 21, 1910. Serial No. 573,016.

*To all whom it may concern:*

Be it known that I, JOHN W. McAULIFFE, a citizen of the United States, residing in the city of New York, State of New York, have invented a new and useful Improvement in Lavatories or Sinks, and declare the following to be a full, clear, and exact description of the same, such as will enable others skilled in the art to which it pertains to make and use the same, reference being had to the accompanying drawings, which form a part of this specification.

My invention has for its object to produce a simple and novel lavatory which shall be neat in appearance, sanitary, and easy to keep clean.

In carrying out my invention, I eliminate the metal faucets for hot and cold water and form the discharge outlet or outlets in the bowl itself, so that the only portions of the fittings which will be exposed above the bowl will be handles of porcelain to control the inflow and the discharge of water.

A further object of my invention is to produce a novel construction of fittings for lavatories or sinks, which will conceal all metal parts, both of the water supply and of the drain.

Figure 1:
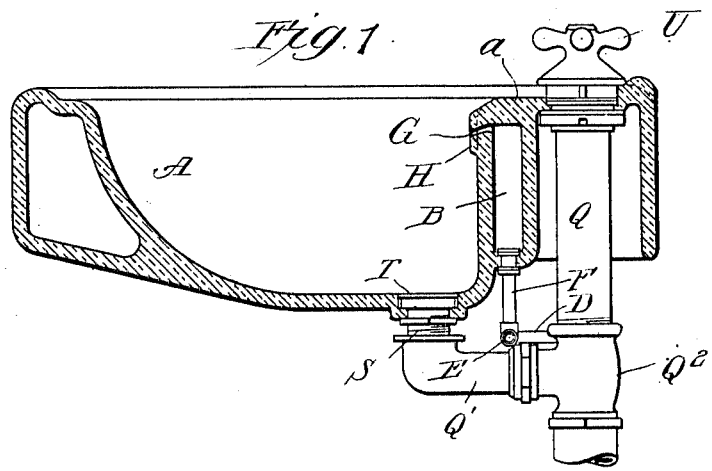
Figure 2:
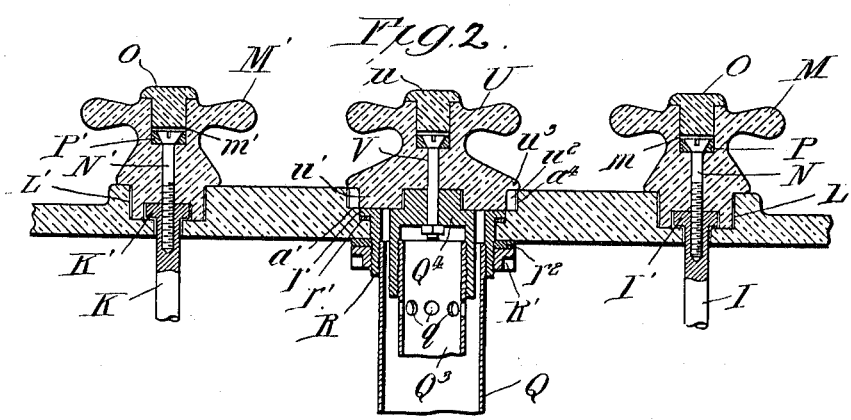

The various features of novelty, whereby my invention is characterized, will hereinafter be pointed out with particularity in the claims; but for a full understanding of my invention and of its objects and advantages, reference may be had to the following detailed description, taken in connection with the accompanying drawing, wherein:

Figure 1 is a longitudinal vertical section through a lavatory arranged in accordance with a preferred form of my invention; and Fig. 2 is a transverse section on an enlarged scale taken on a plane lying behind the bowl of the lavatory.

Referring to the drawings, A represents a sink, lavatory, or the like, of any usual or preferred construction. The rear wall of the bowl portion is hollowed so as to form a closed chamber B. The chamber may be of any desired size, but preferably of such dimensions as to permit it to contain a considerable volume of water as distinguished from a mere conduit or passage. Suitable hot and cold water pipes of which only one, the pipe D is shown, are connected to the chamber in any suitable way. In the arrangement shown, there is a header or pipe E to which the hot and cold water pipes are connected, and this header is connected with the chamber by means of a branch pipe F. At the front of the chamber is a delivery outlet G for permitting water to flow from the chamber into the bowl I and K represent valve stems leading from the hot and cold water valves, (not shown), through the top of the lavatory or sink. In accordance with one feature of my invention, I provide unique handles for the valve stems and fasten the handles to the stems in a novel manner so as to make a strong, simple construction exposing no metal parts to view above the lavatory or sink. The top of the lavatory or sink is countersunk about the upper ends of the valve stems, as indicated at L, L', so as to form sockets for the reduced lower ends of handles M, M'. The upper ends of the valve stems extend into the lower ends of the handles and are squared, headed, or otherwise formed or shaped, as indicated at I' and K', so as to prevent relative rotary movements between the stems and the handles.

N, N' are screws, or the like, which pass downwardly through the handles and into the valve stems for the purpose of holding the handles on the stems. The heads of the screws are sunk with recesses $m$ and $m'$ in the upper ends of the handles, so that, by inserting plugs O and O' of porcelain, or other vitreous material, within the recesses above the screws, the latter are entirely concealed. The recesses $m$ and $m'$ may be made square so as to hold washers P and P', placed under the screw heads, from turning.

Q represents the waste pipe, which I connect at its upper end to the flange or slab $a$, upon which the valve handles are mounted. This I accomplish by forming a countersunk opening $a'$ in the slab; dropping a flanged sleeve R through the opening with the flange $r$ resting upon the shoulder or ledge at the upper end of the smaller portion of the opening; screwing the waste pipe into the sleeve; and locking the sleeve to the slab by means of a nut R' surrounding the sleeve below the slab. Suitable packing, as indicated at $r'$ and at $r^2$ may be placed between the slab, flange and nut, so as to make the joint water tight. A branch pipe Q' leads J. W. McAULIFFE.
LAVATORY OR SINK.
APPLICATION FILED JULY 21, 1910.

1,107,817.

Patented Aug. 18, 1914.

Witnesses:
Harry S. Gaither
Ruby V. Brydges

Inventor:
John W. McAuliffe
By Chamberlin & Freudenreich
attys.

and a nut on said sleeve for clamping the bottom wall of the bowl between it and the flange on the sleeve.

5. In combination, a tubular valve stem, a cap upon one end of the stem, a valve handle of vitreous material having a socket to receive a portion of the cap, the socket and the said portion of the cap being shaped to prevent relative rotary movement, a fastening device extending through the handle into the cap, and a plug of vitreous material within the handle above the fastening device.

In testimony whereof, I sign this specification in the presence of two witnesses.

JOHN W. McAULIFFE.

Witnesses:
A. CHOLLET,
E. NEUBURGER.

Copies of this patent may be obtained for five cents each, by addressing the "Commissioner of Patents, Washington, D. C."